(12) United States Patent
Kawamura

(10) Patent No.: US 8,899,069 B2
(45) Date of Patent: Dec. 2, 2014

(54) FOOD PRESERVING METHOD AND ITS DEVICE

(71) Applicant: Yugengaisha Sun World Kawamura, Kochi-shi, Kochi (JP)

(72) Inventor: Munetoshi Kawamura, Kochi (JP)

(73) Assignee: Yugengaisha Sun World Kawamura, Kochi-shi (JP)

( * ) Notice: Subject to any disclaimer, the term of this patent is extended or adjusted under 35 U.S.C. 154(b) by 0 days.

(21) Appl. No.: 13/851,060

(22) Filed: Mar. 26, 2013

(65) Prior Publication Data

US 2013/0199236 A1      Aug. 8, 2013

Related U.S. Application Data

(63) Continuation of application No. 10/567,951, filed as application No. PCT/JP2004/011458 on Aug. 10, 2004, now abandoned.

(30) Foreign Application Priority Data

Aug. 11, 2003  (JP) .................................. 2003-291346
Mar. 26, 2004  (JP) .................................. 2004-090904

(51) Int. Cl.
  *F25D 11/00*      (2006.01)
  *A23L 3/32*       (2006.01)
(52) U.S. Cl.
  CPC .. *F25D 11/00* (2013.01); *A23L 3/32* (2013.01)
  USPC .......................................................... 62/440
(58) Field of Classification Search
  CPC ........... F25D 11/00; A23L 3/32; A23L 3/005; A01B 12/006

USPC ............ 62/440, 441, 157, 231; 426/237, 238, 426/244
See application file for complete search history.

(56) References Cited

U.S. PATENT DOCUMENTS 5,468,454 A * 11/1995 Kim ............................... 422/121
5,541,392 A *  7/1996 Miklos .......................... 219/771

(Continued)

FOREIGN PATENT DOCUMENTS

JP           62297677 A      12/1987
JP           06257924 A       9/1994

(Continued)

OTHER PUBLICATIONS

Japanese Patent Office, International Search Report of PCT/JP2004/011458, WIPO, 1 page, Nov. 16, 2004.

*Primary Examiner* — Mohammad M Ali
(74) *Attorney, Agent, or Firm* — Alleman Hall McCoy Russell & Tuttle LLP

(57) ABSTRACT

A food preserving method includes the step of housing a conductive food tray in a cooling box, placing food on the food tray and cooling and preserving the food with an AC voltage and a DC voltage being simultaneously applied to the food tray. After a DC-AC simultaneous application period during which the AC voltage and the DC voltage are simultaneously applied, the food is cooled with only one of the DC voltage and the AC voltage being applied to the food tray. A food preserving device including a cooling box, a conductive food tray housed in the cooling box, an AC power supply used for applying an AC voltage to the food tray and a DC power supply used for applying a DC voltage to the food tray is characterizing in that the AC voltage and the DC voltage are simultaneously applied to the food tray.

5 Claims, 6 Drawing Sheets

(56) References Cited

U.S. PATENT DOCUMENTS

| | | | |
|---|---|---|---|
| 5,695,671 A * | 12/1997 | Landwehr et al. | 219/779 |
| 6,451,364 B1 | 9/2002 | Ito | |
| 6,658,879 B2 * | 12/2003 | Park et al. | 62/229 |

FOREIGN PATENT DOCUMENTS

| | | | |
|---|---|---|---|
| JP | 07155154 A | 6/1995 | |
| JP | 769105 B2 | 7/1995 | |
| JP | 2000157159 A | 6/2000 | |
| JP | 2001149773 A | 6/2001 | |
| JP | 2001241824 A | 9/2001 | |
| JP | 2002034531 A | 2/2002 | |
| JP | 2002100493 A | 5/2002 | |
| JP | 2005112839 A | 4/2005 | |
| JP | 2006217832 A | 8/2006 | |
| JP | 2007182390 A | 7/2007 | |
| JP | 2007295802 A | 11/2007 | |
| WO | 9841115 A1 | 9/1998 | |
| WO | 2005013730 A1 | 2/2005 | |
| WO | 2006011264 A1 | 2/2006 | |
| WO | 2006085534 A1 | 8/2006 | |
| WO | 2006100740 A1 | 9/2006 | |

* cited by examiner

FOOD PRESERVING METHOD AND ITS DEVICE

CROSS REFERENCE TO RELATED APPLICATIONS

This application is a continuation of U.S. patent application Ser. No. 10/567,951, entitled FOOD PRESERVING METHOD AND ITS DEVICE, filed Feb. 10, 2006, which is the U.S. National Phase of International Patent Application No. PCT/JP2004/011458, entitled FOOD PRESERVING METHOD AND ITS DEVICE, filed Aug. 10, 2004, which in turn claims priority to Japanese Patent Application Nos. 2004-090904, filed Mar. 26, 2004 and 2003-291346, filed Aug. 11, 2003. Each of these applications is hereby incorporated by reference in its entirety for all purposes.

FIELD OF INVENTION

This invention relates to a food preserving method and a food preserving device. More specifically, the present invention relates to a refrigerating or freezing method and device for preserving food.

DESCRIPTION OF THE RELATED ART

In general, a refrigerating method and a freezing method have been widely used for preserving food for quite a while.

When a food is frozen for a long-time preservation, the quality after the thawing process seriously deteriorates in comparison with the quality before the freezing process, resulting in degradation of the taste. The reason for this is because the oxygen dissolved in the moisture inside each cell of the food (dissolved oxygen) oxidizes the food during the freezing preservation process and because the juice flows out of the food during the thawing process.

The reasons for the flow of juice are presumably because the ice crystals grow so big in size as to break the cell wall of the food during the freezing process and because the foods are frozen with the entrance of the channel of the cells being open. It is believed that when a food is frozen with its cell walls being broken due to its enlarged ice crystals, the dissolved oxygen in organic water inside the cells of the food is discharged out of the cells and frozen in an activated state, with the result that oxidization of the food is accelerated.

Here, the above-mentioned channel refers to a path through which the cell carries out ion exchanges and water exchanges to and from the outside, and it is believed that when the pH value is raised, the entrance of the channel is closed, while when the pH value is lowered, the entrance of the channel is opened. These flow of juice and oxidation due to dissolved oxygen not only seriously deteriorate the quality of the food, but also accelerate degradation after the thawing process.

For example, in the case when food is frozen by the slow freezing method from −18.degree. C. to −20.degree. C. which has been widely used in common, since moisture inside the cell is frozen slowly to make ice crystals big in size to damage the cell walls. Since the food, which has been in a frozen state with its cell walls broken, is frozen with the dissolved oxygen in organic water in each cell discharged out of the cell and activated, oxidation progresses even during the freezing process to cause a serious degradation in the quality of the food (phenomenon so-called "freezer burn"). Moreover, in addition to the damage to cell walls, since the freezing process is carried out with the entrance of the channel of each cell being opened, a lot of juice flows out of the food through the channel entrance at the time of a thawing process.

Moreover, in any of the cases in which a quick freezing method from −40.degree. C. to −50.degree. C. and an ultra-low temperature freezing method from −60.degree. C. to −85.degree. C., which are widely adopted so as to eliminate the above-mentioned defects caused by the slow freezing method, are used to freeze food, since ice crystals do not grow so big in size because of a quick temperature drop, the cell walls of the food are not damaged, and since organic water in the cells is not discharged out of the cells, oxidation is not allowed to progress so quickly; however, since the food is frozen with the entrance of the channel being opened, it is not possible to prevent the juice from flowing out of the food during the thawing process.

With respect to the method to prevent degradation in the quality at the time of the freezing process of the food and after the thawing process thereof, Patent Document 1 discloses a method in which: a food which is placed on a flat electrode inside a freezer is frozen after a direct current (DC) or alternating current (AC) high voltage is applied across a needle-shape electrode and the flat electrode inside the freezer for a predetermined period of time. Moreover, Patent Document 2 discloses a method in which: a food is frozen after a high voltage of 5 to 10 kV with a commercial frequency is applied to a flat plate electrode on which the food is placed only for 5 to 10 minutes. Patent Document 3 discloses a method in which: a food which is placed on an electrically insulated supporting member inside a freezer is frozen with a high-voltage multiplex wave voltage being applied to the supporting member. Patent Document 4 discloses a method in which a food is frozen in a freezer having an electric field atmosphere.

In order to see the effects of these methods, the inventors of the present invention applied each of various high AC voltages and DC voltages to agar jelly in a container which is placed on a stainless tray inside a freezer and this was then thawed at normal temperature so that comparisons were made on taste, a feel, etc. between the jelly before the freezing process and that after the thawing process.

As a result, even in the cases when only an AC high voltage is applied while being frozen and when only a DC high voltage is applied while being frozen as in the above patent documents, it is confirmed that the taste, the feel, etc. after the thawing process deteriorate.

Further, in the case when a food is refrigerated for a long-time preservation also, the same problem arises in which the quality is lowered by oxidation due to dissolved oxygen in the food during the refrigerating and preserving process, and many refrigerating methods and refrigerators have been proposed so as to solve this problem. However, there have not been any refrigerating methods and devices thereof which can provide the same quality as that before the refrigerating process, even after the refrigerating process; and there have been strong demands for such methods and devices.

Therefore, the object of the present invention is to provide a food preserving method and a device thereof, which achieve the same quality as that before the preserving process, even after the preserving process. More specifically, the object of the present invention is to provide a food preserving method and a device thereof, which achieve the same quality as that before the preserving process, even after a long-term refrigerating preservation process or a long-term freezing preservation process.

After having carried out various examinations so as to solve the above-mentioned problems, the inventor of the present invention has found that the above-mentioned problems can be solved by applying an AC voltage and a DC voltage simultaneously, and then completed the present invention.

Patent Document 1: Japanese Patent Application Laid-Open No. 6-257924 (paragraph numbers 0023 to 0025, FIG. 1).

Patent Document 2: Japanese Patent Application Laid-Open No. 7-155154 (paragraph numbers 0033 to 0036, FIGS. 1 and 2)

Patent Document 3: Japanese Patent Application Laid-Open No. 2000-157159 (paragraph numbers 0007 and 0010, FIG. 1)

Patent Document 4: Japanese Patent Application Laid-Open No. 2002-34531 (paragraph number 0004, FIG. 13)

DISCLOSURE OF THE INVENTION

A food preserving method of the present invention includes the steps of housing a conductive food tray in a cooling box, placing a food on the food tray and cooling the food for preservation with an AC voltage and a DC voltage being simultaneously applied to the food tray.

More specifically, the period during which the AC voltage and the DC voltage are simultaneously applied is defined as a DC-AC simultaneous application period, and after a lapse of the DC-AC simultaneous application period, the food is cooled for preservation with only the DC or AC voltage being applied to the food tray. The total application periods of voltage including the DC-AC simultaneous application period is defined as a voltage application period. The above-mentioned cooling box is a freezer used for freezing the food or a refrigerator used for refrigerating the food. With respect to foods, examples thereof include gel-state foods such as agar jelly which is hardened by the agar, perishable foods such as meat, seafood, vegetable and fruit, and general foods such as confectionery, frozen dessert, bread, daily dishes, pickled products, drinks, liquors and food additives. Moreover, examples thereof may also include raw foods, such as raw fish larva and raw paste (minced fish, meat paste or the like), which have been conventionally susceptible to serious freezing failure and difficult to be frozen unless an additive or the like is added thereto, and have had serious degradation in quality even they are thawed from the frozen state.

A food preserving device using the method of the present invention includes a cooling box, a conductive food tray housed in the cooling box, an AC power supply used for applying an AC voltage to the food tray and a DC power supply used for applying a DC voltage to the food tray.

More specifically, the device is provided with a control unit that controls the application of the AC voltage and the DC voltage to the food tray. The period during which the AC voltage and the DC voltage are simultaneously applied is defined as a DC-AC simultaneous application period, and after a lapse of the DC-AC simultaneous application period, the control unit allows only the DC or AC voltage to be applied to the food tray. The total application periods of voltage including the DC-AC simultaneous application period is defined as a voltage application period. The above-mentioned cooling box is a freezer used for freezing the food or a refrigerator used for refrigerating the food. With respect to foods, examples thereof include gel-state foods such as agar jelly which is hardened by the agar, perishable foods such as meat, seafood, vegetable and fruit, and general foods such as confectionery, frozen dessert, bread, daily dishes, pickled products, drinks, liquors and food additives. Moreover, examples thereof may also include raw foods, such as raw fish larva and raw paste (minced fish, meat paste or the like), which have been conventionally susceptible to serious freezing failure and difficult to be frozen unless an additive or the like is added thereto, and have had serious degradation in quality even they are thawed from the frozen state.

BEST MODE FOR CARRYING OUT THE INVENTION

Figure 1:
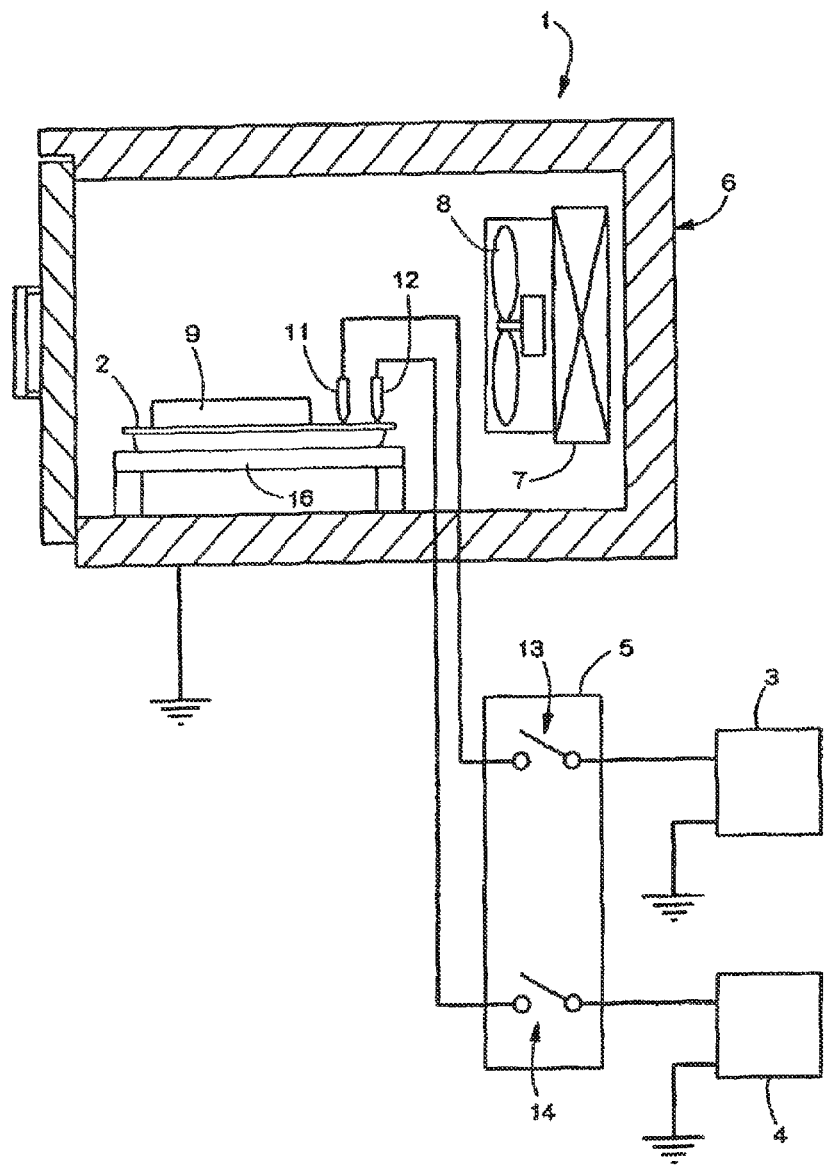
FIG. 1 is a schematic block diagram that shows a food preserving device in accordance with the present invention.
Figure 2:
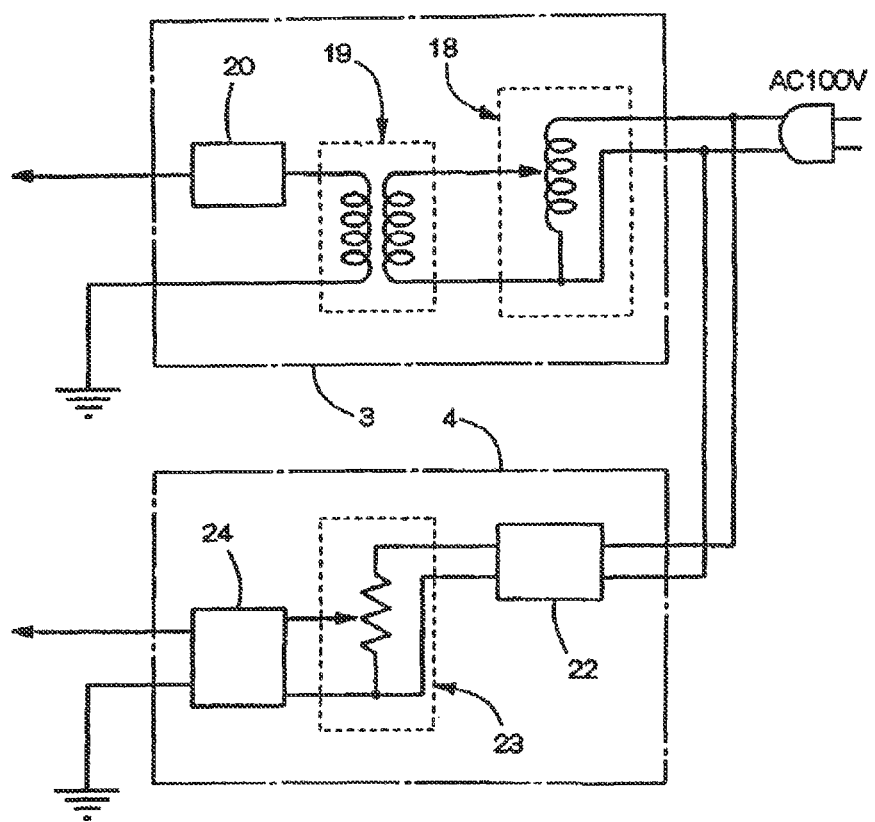
FIG. 2 shows circuit diagrams of an AC power supply and a DC power supply.

FIGS. 1 and 2 show a food preserving device which relates to the present invention, and as shown in FIG. 1, is provided with a cooling box 1 serving as a freezer that houses food therein to be frozen, a tray (food tray) 2 that is placed inside the cooling box 1, a high-voltage AC power supply 3 that outputs an AC high voltage, a high-voltage DC power supply 4 that outputs a DC high voltage that outputs a DC high voltage and a control unit 5 that controls the voltage application from the respective power supplies 3 and 4 to the tray 2. A door sensor that detects the opening and closing operations of the door of the cooling box 1, a weight sensor that detects the fact that food is placed on the tray 2 and the like are connected to the control unit 5.

A peripheral wall 6 of the cooling box 1, which has a heat-insulating structure, is connected to ground. A heat exchanger 7 for cooling the inside of the box, a vent fan 8, etc. are installed in the cooling box 1. The heat exchanger 7 is connected to a cooling machine constituted by a condenser and the like, not shown.

The cooling box 1 may be prepared as a freezer as described above or as a refrigerator that houses food therein to be refrigerated. Moreover, the cooling box 1 may have both functions of refrigerating and freezing so as to be selected on demand.

The tray 2, which is made of metal such as stainless having a conductive property, allows a food 9 to be placed thereon. The food 9 may be directly placed on the tray 2, or the food 9 may be put in a container so that the container with the food 9 is placed on the tray 2. For example, in the case when the food 9 is a gel-state food such as agar jelly, the jelly may be housed and sealed in a plastic container.

An AC output terminal 11 and a DC output terminal 12 are connected to the tray 2. The AC output terminal 11 is connected to the high-voltage AC power supply 3 through a first switching unit 13 of the control unit 5, and the DC output terminal 12 is connected to the high-voltage DC power supply 4 through a second switching unit 14 of the control unit 5. The respective switching units 13 and 14 are constituted by relays, switching elements and the like. The tray 2 is placed on an insulated supporting member 16 around the bottom of the cooling box 1.

As shown in FIG. 2, the high-voltage AC power supply 3 is connected to a commercial power supply (AC 100 V) on the input side, and a voltage-adjusting variable transformer 18 and a voltage-raising transformer 19 are connected thereto in succession from the input side. The output of the voltage-raising transformer 19 is connected to the first switching unit 13 of the control unit 5 through a current control resistor 20. Here, the output of the high-voltage AC power supply 3 is set to the same frequency (50/60 Hz) as that of the commercial power supply. The high-voltage AC power supply 3 may be prepared as an AC power supply that outputs not only an AC high voltage, but also an AC voltage that is variably changed in a range of AC 0 to 15000 V. One of the outputs of the voltage-raising transformer 19 is connected to the inside of the preserving device.

The high-voltage DC power supply 4 is connected to the commercial power supply on its input side, and an AC/DC converter 22, a voltage-adjusting variable resistor 23 and a DC/DC converter 24 are connected thereto in succession from the input side. The output of the DC/DC converter 24 is connected to the second switching unit 14 of the control unit 5. Here, the DC/DC converter 24 is provided with a protective circuit that prevents an over-current and a reverse current of an electric current, and the like. The high-voltage DC power supply 4 may be prepared as a DC power supply that outputs not only a DC high voltage, but also a DC voltage that is variable in a range of DC-9000 to 0V. One of the outputs of the DC/DC converter 24 is connected to the inside of the preserving device.

The control unit 5 controls the voltage output and the like from the power supplies 3 and 4 to the tray 2 so that the voltage application is controlled. More specifically, as shown in FIG. 2, the control unit 5, which is provided with the first switching unit 13 and the second switching unit 14, turns both of the first switching unit 13 and the second switching unit 14 on, upon determination that the door of the cooling box 1 has been closed with the food 9 being placed on the tray 2 based upon the detection results by the door sensor, the weight sensor and the like. Consequently, the food 9 on the tray 2 is cooled while the AC high voltage and the DC high voltage are simultaneously being applied to the tray 2.

Figure 3:
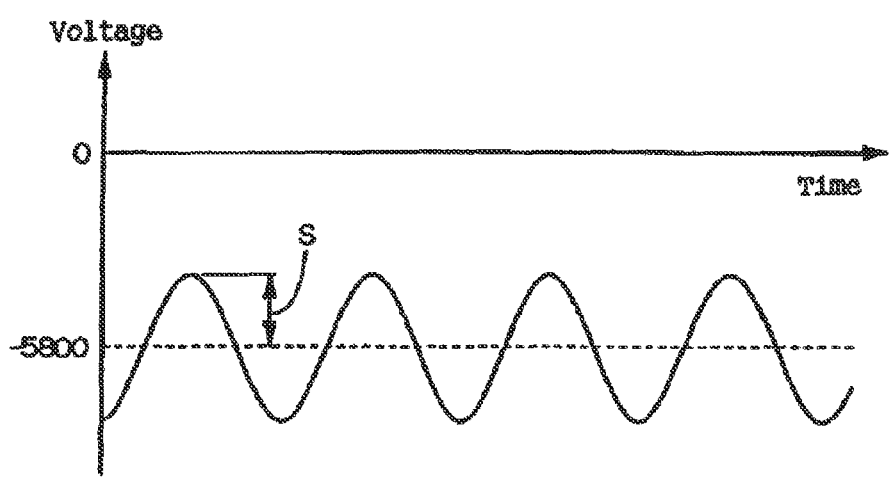
FIG. 3 is a diagram of voltage waveforms to be applied to a tray during a DC-AC simultaneous application period.

Here, in the case when the output of the high-voltage AC power supply is set to 1250 V (effective value) while the output of the high-voltage DC power supply is set to −5800 V, the voltage to be applied to the tray 2 forms a negative voltage in which a sine wave having the same frequency as the frequency of the commercial power supply with an amplitude S of about 1768 V is multiplexed on the DC voltage of −5800 V, as shown in FIG. 3. After a lapse of a predetermined period of time (DC-AC simultaneous application period) from the beginning of the application of voltages of AC and DC, the control unit 5 turns only the first switching unit 13 or the second switching unit 14 off. In other words, only the DC high voltage or AC high voltage is applied to the tray 2.

The cooling process is continuously carried out on the food 9 on the tray 2, with only the DC high voltage or the AC high voltage being applied thereto, so that the food 9 is refrigerated or frozen. After a lapse of a predetermined period of time (voltage application period) from the simultaneous application of the AC voltage and the DC voltage, the control unit 5 turns off either the second switching unit 14 or the first switching unit 13 that has been in an on state.

Conditions under which the AC voltage and the DC voltage are applied are appropriately determined depending on the kinds of food to be preserved, organic energy and degree of oxidation. Moreover, in the case when the food to be stored is a perishable food, the application conditions are appropriately determined depending on the environment in which the food has been grown.

For example, when meat, seafood or the like is frozen, an AC voltage of 350 V or more and a DC voltage of −350 V or greater on the negative side are preferably applied thereto. When vegetables or fruits are frozen, an AC voltage of 180 V or more and a DC voltage of −180 V or greater on the negative side are preferably applied thereto, and when agar jelly is frozen, an AC voltage of 755 to 3500 V and a DC voltage of −7160 to −970 V are preferably applied thereto. However, these voltage values also vary depending on the states of the respective foods upon preservation. Moreover, it has been confirmed that, when the negative DC voltage to be applied is set higher on the negative side than the AC voltage, delicious flavors and smells of the food are reduced. Therefore, by adjusting the AC voltage and the DC voltage, it becomes possible to adjust the degree of delicious flavors and smells. Moreover, it is confirmed that, when the DC voltage to be applied is set as a positive voltage and applied simultaneously with the AC voltage, the oxidation of the food is accelerated and the aging of the food cannot be prevented, and that in contrast, when a negative DC voltage and an AC voltage are simultaneously applied, in addition to the effect that no oxidation occurs in the food, the aging of the food can be prevented and even the food is matured during the long-time preservation. Furthermore, it is also confirmed that, in the case when a positive DC voltage is applied, since the food tends to become acidic, adverse tastes, such as bitter taste and unpleasant taste, are generated.

With respect to the DC-AC simultaneous application period, not particularly limited, it is appropriately changed depending on the kinds of food and the preservation method (to be refrigerated or frozen). For example, in the case when agar jelly is frozen, the DC-AC simultaneous application period may be set to first 5 minutes of the cooling period, or not limited to this, it may be set within first 3 to 7 minutes of the cooling period.

The voltage application period may also be appropriately changed depending on the kinds of food and the preservation method (to be refrigerated for frozen). In the case when a food is frozen and preserved, the voltage application period may be set to a period required for the freezing process of the food. For example, upon freezing agar jelly, the voltage application period may be set to 120 minutes that is a period required for the freezing process of agar jelly.

Moreover, depending on foods to be refrigerated or frozen, the AC-DC simultaneous application period and the voltage application period may be set to the same period, and in some cases, the AC voltage and the DC voltage only need to be simultaneously applied, without the necessity of the succeeding application of only the DC voltage or AC voltage.

The control unit 5 may control the voltage output to the tray 2 from the respective power supplies 3 and 4, by turning on and off the input side of each of the AC power supply 3 and the DC power supply 4.

With respect to food 9, examples thereof include gel-state foods such as agar jelly which is hardened by the agar, perishable foods such as meat, seafood, vegetable and fruit, and general foods such as confectionery, frozen dessert, bread, daily dishes, pickled products, drinks, liquors and food additives. Moreover, examples thereof may also include raw foods, such as raw larva and raw paste (minced fish, meat paste or the like), which have been conventionally susceptible to serious freezing failure and difficult to be frozen unless an additive or the like is added thereto, and have had serious degradation in quality even they are thawed from the frozen state.

When food is refrigerated or frozen as described above, the following functions and effects are obtained.

(1) Inactivation of Dissolved Oxygen

When an AC voltage and a DC voltage are applied to food in accordance with the present invention, electrons are imposed on the food, and electrons in dissolved oxygen of the food are stabilized (inactivated) prior to chemically reacting with amino acids, protein, blood and the like in the food, so that it becomes possible to prevent oxidation of the food.

This effect is clearly confirmed, in particular, by Embodiments 5 and 6, which will be described later.

(2) Miniaturization of Water Molecule Cluster

It is thought that the organism intakes a DC current into its cells from the earth and by continuously supplying electrons through the DC current and its own feeble AC current, sixteen electrons of dissolved oxygen are held and always stabilized while it is alive. This is a common idea for vegetables, animals, fishes and the like.

The invention described in the present application is based upon the above-mentioned idea. When a voltage is applied to food in accordance with the present invention so that electrons are imposed thereon, water molecules in the food attract one another and the water molecule cluster becomes smaller to be aligned to a sequence that holds electrons in dissolved oxygen. In other words, the dissolved oxygen in the food is stabilized in the same manner as that in the organism in the living state, so that it becomes possible to prevent oxidation of the food in the same manner as the effect obtained in the above-mentioned item (1).

This effect is clearly confirmed, in particular, by Embodiments 5 and 6, which will be described later.

The above-mentioned two effects are exerted in any of the cases in which food is refrigerated and in which food is frozen, and when food is frozen and preserved by using the present invention, the following effects are obtained in addition to the above-mentioned effects.

(3) Inhibition of the Flow of Juice

In the case when food is frozen while an AC voltage and a DC voltage are being applied thereto in accordance with the present invention, since the water inside the cells is frozen, with the water molecule cluster in the food being made smaller, ice crystals are not allowed to grow big in size, thereby preventing them from damaging cell walls of the food. Therefore, it becomes possible to prevent the flow of juice caused by damages in cell walls as described in the column of the prior art. When the food to be frozen in accordance with the present invention is prepared as meat or fish and the like, the AC voltage and DC voltage to be applied are preferably set to an AC high voltage of 755 V or more and a DC high voltage of −970 V or greater on the negative side.

Moreover, as described earlier, each cell in an organism has a channel that serves as a path through which exchanges of ions and water are conducted to and from the outside, and the entrance of which is closed when the pH value becomes high, and when electrons are continuously imposed on the food in accordance with the present invention, the pH value of the food increases, thereby closing the entrance of the channel. In other words, in the case when food is frozen in accordance with the present invention, since the food is frozen with the channel entrance of the cell being closed, a flow of juice, which causes degradation in the quality, does not take place even when the food is thawed.

This effect is clearly confirmed, in particular, by Example 3, which will be described later.

Here, the application of the above-mentioned voltage needs to be continued during the period required for freezing the food because the pH value returns to the original value when it is stopped.

The effect of inhibiting the flow of juice of the present invention is exerted not only when food is frozen by using the present invention, but also when food, which has been frozen through the conventional method, is refrigerated and thawed by using the present invention. More specifically, since cells of food, which have been frozen through the conventional method, are in a frozen state with the entrance of the channel being opened as described earlier, the juice tends to flow out through the entrance of the channel when thawed, resulting in degradation in the quality. Therefore, in the case when the food is refrigerated and thawed while an AC voltage and a DC voltage are being applied in accordance with the present invention, organic water inside the cells is thawed prior to ice and electrons are continuously supplied to this portion, with the result that the pH value increases to again close the opened entrance of the channel and consequently to inhibit the flow of juice. In this case also, the application of the above-mentioned voltage needs to be continued during the period required for thawing the food.

Example 1

The recovery rate was measured after a freezing process by the preserving device of the present invention with various amounts of the AC voltage and DC voltage. With respect to the food 9, 70 g of agar jelly was put and sealed in a thin dish-state plastic container, and used in the measurements. The ambient temperature was set to 30.8.degree. C., and the frozen jelly was thawed in the atmospheric temperature of 30.8.degree. C. A freezer chamber of a household refrigerator (made by Sharp Corp.) was used as the cooling box 1, and the temperature of the freezer chamber was set to −20.degree. C. The freezer chamber had a freezing function of notation "four stars" in compliance with the standard of Japanese Industrial Standard (JISC9607). In other words, the freezer chamber had such a freezing function that 4.5 kg of a product to be frozen could be cooled to −18.degree. C. or less within 24 hours per 100 liters of the effective inner volume of the freezer chamber. The DC-AC simultaneous application period was set to first 5 minutes of the freezing period.

With respect to the recovery rate, qualities, such as elasticity, strength, taste and color tones, are compared between jelly before the freezing process and after the thawing process, and when the jelly after the thawing process was kept in the same quality as the quality of jelly before the freezing process, this state was evaluated as 100%, and as the quality decreases in the taste, color tones and the like in comparison with the jelly before the freezing process, the percentage was lowered. The recovery rate of 97% or more is considered to be within an allowable range.

Test Example 1

The output voltage of the AC power supply 3 was set to 1250 V, while the output voltage of the DC power supply 4 was set to −1230 V, and after these AC and DC voltages had been simultaneously applied to the tray 2 for 5 minutes, only the DC voltage was applied for 115 minutes (the voltage application period was set to 120 minutes required for the freezing process).

Test Example 2

The output voltage of the AC power supply 3 was set to 1250 V, and the output voltage of the DC power supply 4 was set to −4000 V. The other conditions were same as those of Test Example 1.

Test Example 3

The output voltage of the AC power supply 3 was set to 1250 V, and the output voltage of the DC power supply 4 was set to −5800 V. The other conditions were same as those of Test Example 1.

Test Example 4

The output voltage of the AC power supply 3 was set to 1250 V, and the output voltage of the DC power supply 4 was set to −7160 V. The other conditions were same as those of Test Example 1.

Test Example 5

The output voltage of the AC power supply 3 was set to 3500 V, and the output voltage of the DC power supply 4 was set to −7160 V. The other—conditions were same as those of Test Example 1.

Test Example 6

The output voltage of the AC power supply 3 was set to 755 V, and the output voltage of the DC power supply 4 was set to −970 V. The other conditions were same as those of Test Example 1.

Comparative Example 1

The output voltage of the AC power supply 3 was set to 3800 V, and the output voltage of the DC power supply 4 was set to −7160 V. The other conditions were same as those of Test Example 1.

Comparative Example 2

The output voltage of the AC power supply 3 was set to 670 V, and the output voltage of the DC power supply 4 was set to −300 V. The other conditions were same as those of Test Example 1.

Comparative Example 3

Only the DC voltage of −7160 V was applied to the tray 2 for 120 minutes. The other conditions were the same as those of Test Example 1.

Comparative Example 4

Only the DC voltage of −4000 V was applied to the tray 2 for 120 minutes. The other conditions were the same as those of Test Example 1.

Comparative Example 5

Only the AC voltage of 1250 V was applied to the tray 2 for 120 minutes. The other conditions were the same as those of Test Example 1.

(Measurements)

Between the jelly frozen in each of Test Examples 1 to 6 of the present invention and the jelly frozen in each of Comparative Examples 1 to 5, the recovery rate was measured. Table 1 shows the results of the results.

TABLE 1

| | Recovery Rate (%) | pH | Texture |
|---|---|---|---|
| Test Example 1 | 98 | 3.76 | Good |
| Test Example 2 | 98 | 3.77 | Good |
| Test Example 3 | 100 | 3.80 | Good |
| Test Example 4 | 97 | 3.75 | Good |
| Test Example 5 | 97 | 3.78 | Good |
| Test Example 6 | 97 | 3.76 | Good |
| Comparative Example 1 | 90 | 3.80 | Slightly bad in strength |
| Comparative Example 2 | 90 | 3.79 | Slightly bad in strength |
| Comparative Example 3 | 80 | 3.74 | Lacking strength and smoothness, and crumbly |
| Comparative Example 4 | 95 | 3.77 | Weak in strength, lacking smoothness, and crumbly |
| Comparative Example 5 | 20 | 3.76 | Bad |

Each of jellies frozen in Test Examples 1 to 6 were kept 97% or more in the recovery rate in the jelly after the thawing process, and confirmed to be virtually free from degradation in qualities, such as elasticity, strength, texture and color tones. In particular, the jelly frozen in Test Example 3 had a recovery rate of 100%, and was confirmed to provide the quality that was equivalent to the jelly before the freezing process. Moreover, even when the DC-AC simultaneous application period was varied within 3 to 7 minutes, it was confirmed that the same results were obtained.

In contrast, jellies frozen in Comparative Examples 1 to 5 had a recovery rate of 95% or less in the jelly after the thawing process; thus, it was confirmed that there was a serious degradation in qualities due to the freezing process. Furthermore, in Test Examples 1 to 6 and Comparative Examples 1 to 5, the pH after the thawing process was kept within a range of 3.74 to 3.80 in comparison with 3.77 obtained before the freezing process; thus, it was confirmed that there were virtually no changes.

Example 2

Using sliced tuna as the food 9, the tuna was frozen and preserved by using the preserving device of the present invention so that, after the thawing process, the color variation (browning) on the surface of sliced fish was measured. The measurements were carried out on both of those slices (test products) to which a voltage had been applied upon freezing and those slices (contrast products) to which no voltage had been applied.

Figure 4:
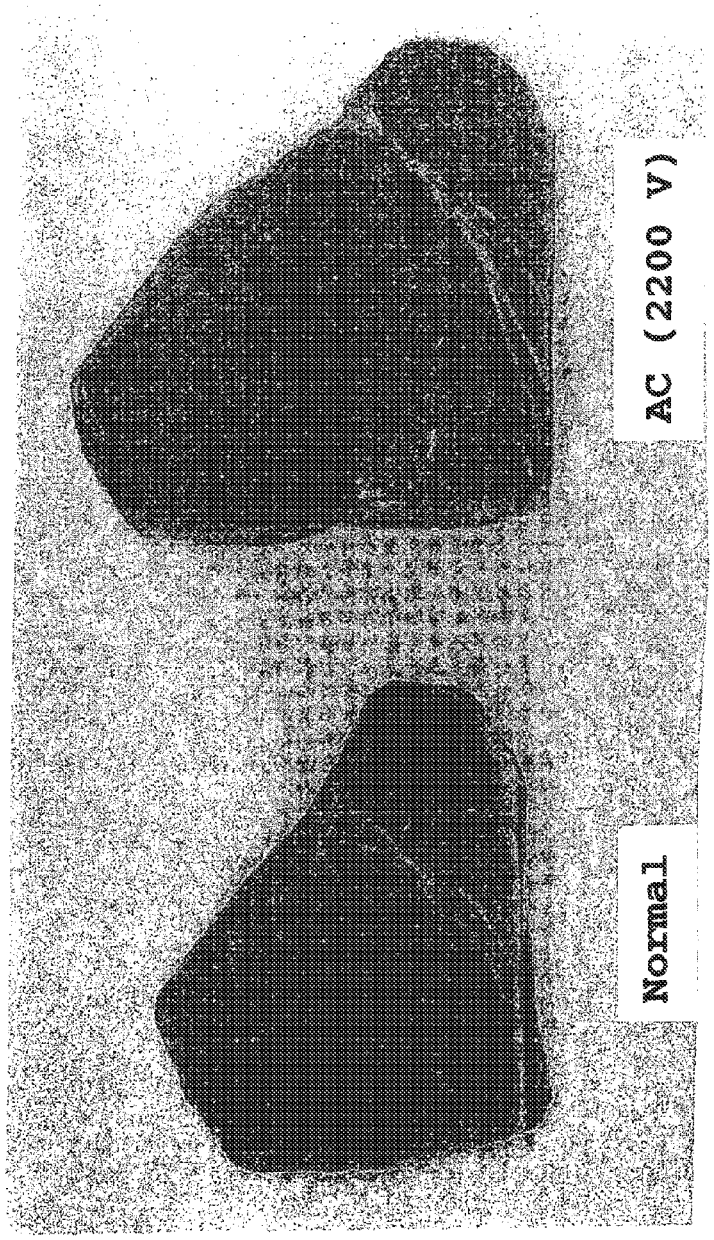
FIG. 4 shows photographs of a test sample and a contrast sample used for measurements of Embodiment 2.

The preserving device used in the measurements was the same as that of Example 1. With respect to the freezing conditions of the test products, the temperature of the freezer chamber was set to −20.degree. C. and the DC-AC simultaneous application period was set to 5 minutes; and with respect to the application conditions of voltage, the output voltage of the AC power supply 3 was set to 2200 V, and the output voltage of the DC power supply 4 was set to −1230 V. After AC and DC voltages had been simultaneously applied to the tray 2 only for 5 minutes, only the AC voltage was applied for 115 minutes while the freezing process was being carried out (the voltage application period was set to 120 minutes required for the freezing process). The contrast products were frozen under the conditions in which only the application of voltage was omitted in comparison with the test products. Both of the frozen pieces were preserved for 6 days at a temperature of −20.degree. C. Thereafter, both of the pieces were thawed under flowing water under the same conditions, and after having been refrigerated and preserved for one night, the Lab value on the surface of each of the two pieces was measured by using a color difference meter. Photographs of the measured two pieces are shown in FIG. 4, and the results of the measurements are shown in the following Table 2.

TABLE 2

|  |  | L value | a Value | b Value |
|---|---|---|---|---|
| Before Freezing |  | 19.64 | 13.97 | 7.55 |
| After Freezing | Test product | 23.70 | 17.58 | 12.92 |
|  | Contrast product | 22.95 | 16.73 | 11.72 |

(Number of Samples = 4)

As shown in the photograph of FIG. 4, it was confirmed that one portion of the surface of the contrast product clearly had a brown discoloration (discolored into a blackish portion); however, no discolored portion was found in the test product. With respect to the Lab values, the test products had higher values in any of the values so that from the general point of view, it was confirmed that the test products exerted higher effects on inhibition of the brown discoloration. As a result, it has been found that upon freezing raw meats such as sliced tuna also, the present invention makes it possible to improve the quality more effectively in comparison with the conventional freezing process.

Example 3

Using raw fish larva as the food 9, the raw fish larva was measured on quality variations by the preserving device of the present invention. Here, "dorome" or gluttonous go by was used as a sample. "Dorome" refers to raw larva of sardine and the like, and is a commonly used name in an area such as Kochi Prefecture, Japan. Each of the fish has a total length of about 10 cm, with a long, thin semi-transparent body. It is served unheated, without being subjected to a processing treatment, and is one of delicacies. The measuring method was virtually the same as that of Example 2. A lump of about 100 g of "dorome" was used as the sample, and between the lump that had been frozen and preserved by the preserving device of the present invention (test product) and the lump that had been frozen by a conventional method (contrast product), the amounts of drip liquids were measured and compared. The same freezer device as Example 1 was used as a freezer device for the test product. The temperature of the freezer chamber was set to −20.degree. C. and the DC-AC simultaneous application period was set to 5 minutes; and with respect to the application conditions of voltage, the output voltage of the AC power supply 3 was set to 2200 V, and the output voltage of the DC power supply 4 was set to −1230 V. After AC and DC voltages had been simultaneously applied to the tray 2 only for 5 minutes, only the AC voltage was applied for 115 minutes while the freezing process was being carried out (the voltage application period was set to 120 minutes required for the freezing process).

The contrast product was frozen by using a high-speed freezer of −40.degree. C. to −50.degree. C. which had been generally used in many cases. Both of the frozen products were preserved for two weeks at a temperature of −20.degree. C., and were thawed at room temperature under the same conditions, and each of these was subjected to a centrifugal separation treatment (1600.times.G, 4.degree. C., for 30 minutes).

The weights of the flow of juice of the respective products separated through the centrifugal separation process were measured, and the weight % to the pre-treatment gross amount was calculated. The results thereof are shown in the following Table 3.

TABLE 3

|  | Flow of Juice (%) |
|---|---|
| Test Product | 12.4 |
| Contrast Product | 20.5 |

(Number of Samples = 2)

As shown in Table 3, the amount of a flow of juice thus separated of the test product was clearly smaller than that of the contrast product. A flow of juice was visually observed on the contrast product with the result that it smelled fishy and it is not good for eating; in contrast, the amount of the flow of juice was smaller in the test product, and it did not have the fishy smell and maintained enough quality for eating. Conventionally, when raw larva of this type, as it was, was frozen and preserved, the quality failure was so serious that the thawed raw larva was not good for eating; however, it has been found that the raw larva frozen by the preserving device of the present invention had good enough quality to eat. When bacteriological examinations were conducted on both of the test product and the contrast product before and after the freezing process, it was confirmed that, in the test product, an increase in the number of general bacteria was prevented.

Example 4

Using raw minced fish as the food 9, quality variations occurring in boiled fish paste produced by using this mined fish were measured. With respect to a material of the minced fish, "wanieso" (Saurida wanieso or lizard fish), which is a kind of fish commonly used as a material for Japanese steamed fish sausage, was used. After "wanieso" had been processed into minced fish by using a normally used method, a test product and a contrast product were respectively subjected to a freezing process under the same conditions as those of Example 3. Both of the frozen products were preserved for two months at a temperature of −20.degree. C. Thereafter, the residual ratio of salt-soluble myofibril protein, which serves as an index of the elasticity of boiled fish paste, was measured on both of the products, and fish sausages were respectively produced by using a normal method under the same conditions so that the qualities were compared with each other.

The measurement of the residual ratio was conducted by using the following method. A predetermined amount of each of the test product and the contrast product was added to each of (a) NaCl solution of 0.05 M, (b) NaCl solution of 0.5 M and (c) NaOH solution of 0.1 M so as to be extracted, and the protein content of the resulting extracted solution was measured by Kjeldahl method. The protein content thus measured was substituted for the following equation: [protein content of (b)-protein content of (a)]/{protein content of (c)-protein content of (a)}.times.100, and the resulting value was defined as the residual ratio. The results of measurements are shown in the following Table 4.

TABLE 4

|  | Residual Ratio | Formability |
|---|---|---|
| Test Product | 85.3 | ○ |
| Contrast Product | 75.4 | X |

(Number of Samples = 2)

The above-mentioned residual ratio was 85.3 in the test product, and 75.3 in the contrast product. Based upon these values, it has been confirmed that the present invention can keep the residual ratio of salt-soluble myofibril protein high that is indispensable for elasticity of boiled fish paste products. With respect to the boiled fish paste, the test product was elastic and had a commercial value; in contrast, the contrast product became sponge-like with lines entered therein, and its elasticity was weak, reducing its commercial value. It has been confirmed that even in the case of raw minced meat that conventionally can not be used due to degradation in quality after the freezing process unless an additive is added, the freezer device of the present invention allows it to be used as a material for boiled paste products without adding any additive. Here, the kind of the minced meat is not limited to fish meat, and livestock meat may also be used.

Example 5

Using cubic pieces of tuna as the food 9, the cubic pieces of tuna were frozen and preserved by the preserving device of the present invention so that the color variation (browning) on the surface of each of the cubic pieces was measured. With respect to the cubic pieces of tuna, the sliced tuna cut into cubes with about 1 cm in each side was used. The measurements were carried out on both of those cubes to which a voltage had been applied upon freezing (test products) and those cubes to which no voltage had been applied (contrast products).

The preserving device used in the measurements was the same as that of Example 1. With respect to the freezing conditions of the test products, the temperature of the freezer chamber was set to –20.degree. C. and the DC-AC simultaneous application period was set to 33 hours and 30 minutes; and with respect to the application conditions of voltage, the output voltage of the AC power supply 3 was set to 2020 V, and the output voltage of the DC power supply 4 was set to –3000 V. After AC and DC voltages had been simultaneously applied to the tray 2 for 33 hours and 30 minutes, the application of voltage was stopped (DC-AC simultaneous application period=voltage application period). The contrast products were frozen under the condition in which only the application of voltage was omitted in comparison with the test products. Both of the frozen test products and contrast products were further preserved for 85 hours and 30 minutes (about 3 days and a half) at a temperature of –20.degree. C. With respect to both of the products, those wrapped so as to block the outside air and those without wrapping were prepared and the measurements were carried out on both of the cases. Photographs of the measured two pieces are shown in FIG. 5.

Figure 5:
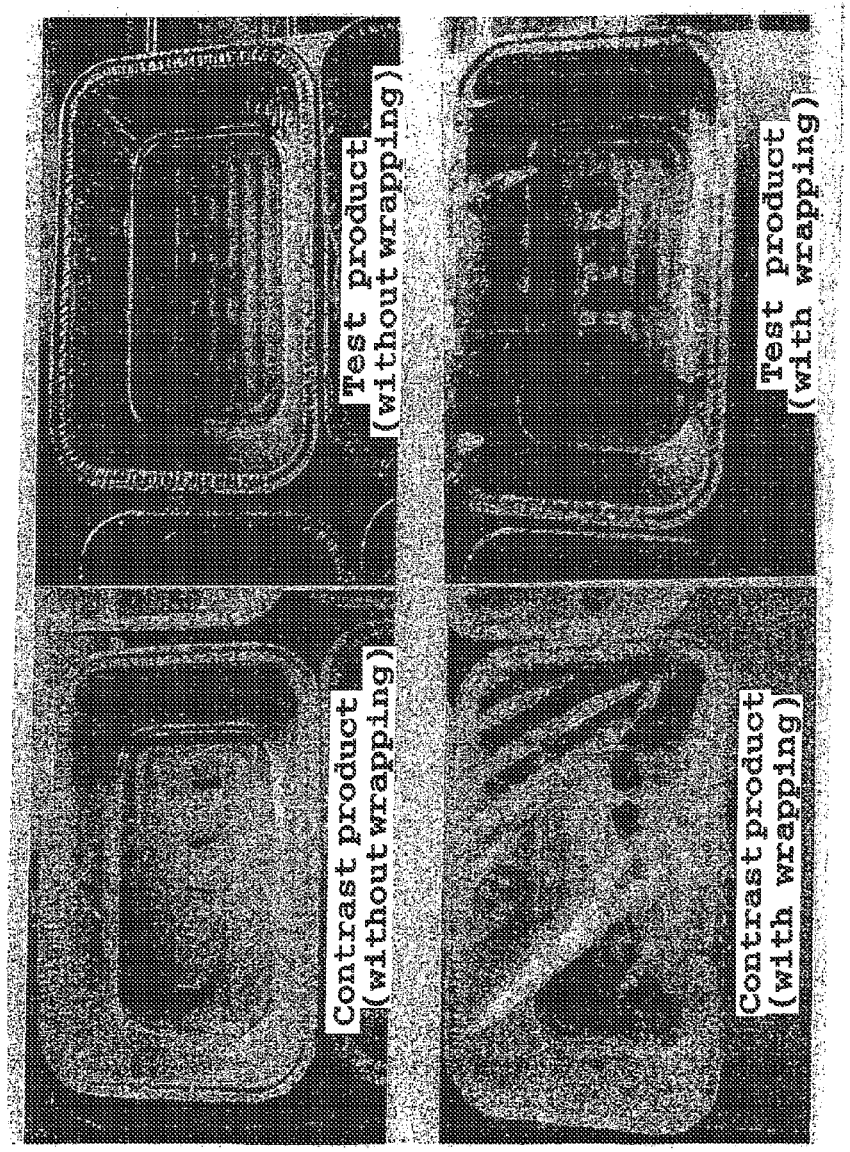
FIG. 5 shows photographs of a test sample and a contrast sample used for measurements of Embodiment 5.

As shown in the photographs in FIG. 5, a discoloration (freezer burn) (whitish discoloration) was observed on the surfaces of both the contrast products with wrapping and without wrapping due to oxidation, and therefore it was confirmed that the contrast products were oxidized not only by external oxygen, but also by dissolved oxygen in the tuna cubic piece.

In contrast, no discoloration was observed on the surfaces of both the test products with wrapping and without wrapping, and therefore it can be concluded that oxidation due to dissolved oxygen could be prevented in the test products. Accordingly, it is confirmed that upon freezing cubic pieces of tuna also, the oxidation is clearly prevented in comparison with the conventional freezing process.

Example 6

Using cubic pieces of tuna as the food 9, the cubic pieces of tuna were frozen and preserved by the preserving device of the present invention, and the lipoperoxide thereof was measured. With respect to the cubic pieces of tuna, sliced tuna cut into cubes with about 1 cm in each side was used in the same manner as Example 5. The measurements were carried out on both of those cubes to which a voltage had been applied upon freezing (test products) and those cubes to which no voltage had been applied (contrast products).

The preserving device used in the measurements was the same as that of Example 1. With respect to the freezing conditions of the test products, the temperature of the freezer chamber was set to –20.degree. C. and the DC-AC simultaneous application period was set to 9 hours and 30 minutes; and with respect to the application conditions of voltage, the output voltage of the AC power supply 3 was set to 2020 V, and the output voltage of the DC power supply 4 was set to –3000 V. After AC and DC voltages had been simultaneously applied to the tray 2 for 9 hours and 30 minutes, the application of voltage was stopped (DC-AC simultaneous application period=voltage application period). The contrast products were frozen under the condition in which only the application of voltage was omitted in comparison with the test products. Both of the frozen test products and contrast products were further preserved for 110 hours and 30 minutes (about 3 days and a half) at a temperature of –20.degree. C. With respect to both of the products, those wrapped so as to block the outside air and those without wrapping were prepared and the measurements were carried out on both of the cases. Thereafter, the lipoperoxide of each of the products was measured at an absorbance of 532 nm by using a thiobarbituric acid reactant (TBARS) measuring method. More specifically, the amount of malonic dialdehyde per 1 mg of protein was measured. The results are shown in FIG. 6.

Figure 6:
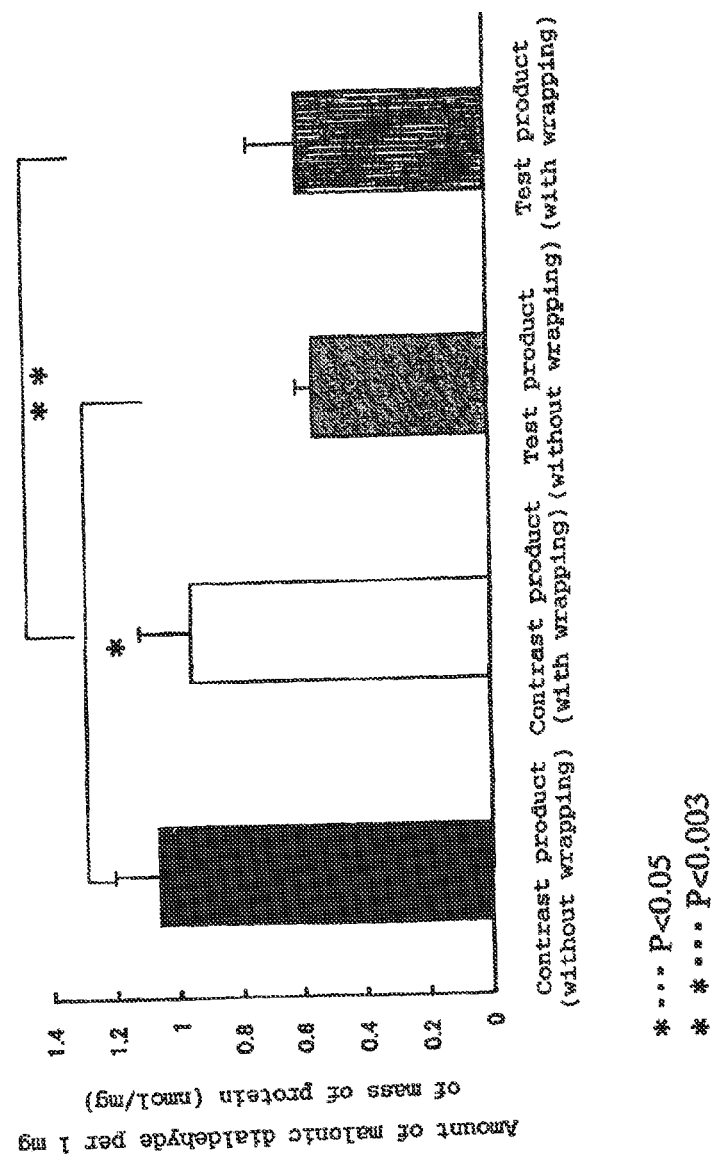
FIG. 6 is a graph that shows the results of measurements on peroxylipid between a test sample and a contrast sample of Embodiment 6.

As shown in FIG. 6, it was confirmed that the amount of lipoperoxide of the contrast products in both of those with wrapping and those without wrapping was clearly greater than that of the test products in both of those with wrapping and those without wrapping; therefore, it can be concluded that oxidation was prevented in the test products. In both of the test products and the contrast products, no big difference was found between those with wrapping and without wrapping. Here, in this Embodiment, the number of samples was 5 in the respective test products and contrast products.

The results of the above-mentioned measurements were statistically analyzed by using a t-assay so that the p-value was calculated. The p-value refers to a value calculated from data between two different groups, and when the p-value is lower than 0.05, it is statistically indicated that the two groups have a significant difference. As a result of the analysis of the t-assay on the results of the present Example, $p<0.05$ was held between those without wrapping of the contrast products and those without wrapping of the test products, and $p<0.003$ was held between those with wrapping of the contrast products and those with wrapping of the test products; thus, it has been proven that there are significant differences respectively.

Example 7

Using a strawberry short cake sealed in a plastic container as the food 9, the cake was refrigerated and preserved by the preserving device of the present invention so that the texture, taste, discoloration, and the like of the cakes were evaluated on a scale of 1 to 5. The measurements were carried out on both of those cakes to which a voltage had been applied upon freezing (test products) and those cakes to which no voltage had been applied (contrast products 2).

The refrigerating chamber of a household refrigerator used in Example 1 was used as the cooling box 1, and the temperature of the refrigerating chamber was set to 8.degree. C. and the DC-AC simultaneous application period was set to 5 hours. With respect to the application conditions of voltage, the output voltage of the AC power supply 3 was set to 1273 V, and the output voltage of the DC power supply 4 was set to −320 V. After AC and DC voltages had been simultaneously applied to the tray 2 for 5 hours, the cake was refrigerated and preserved at a temperature of 8.degree. C. for 157 hours with only the AC voltage being applied (DC-AC simultaneous application period: 162 hours). The contrast product 2 was frozen under the condition in which only the application of voltage was omitted in comparison with the test product. Thereafter, the resulting cakes were tried by nine people, and the texture, taste, discoloration, and the like of the cakes were evaluated. With respect to the evaluation, the 1-5 scale evaluation was carried out in which "5" was given for the best, while "0" was given for the worst that was no longer evaluated due to decomposition. Here, a fresh cake which was not refrigerated and preserved was prepared as a contrast product 1. The results of evaluation are shown in Table 5.

TABLE 5

|  |  | Woman in her 20s | Woman in her 20s | Man in his 20s | Man in his 20s | Man in his 30s | Man in his 50s | Man in his 50s | Man in his 60s | Man in his 60s |
|---|---|---|---|---|---|---|---|---|---|---|
| Contrast product 1 | Color of whipped cream | 5 | 5 | 5 | 5 | 5 | 5 | 5 | 5 | 5 |
|  | Taste of whipped cream | 4 | 5 | 5 | 5 | 5 | 4 | 5 | 5 | 5 |
|  | Taste of strawberry | 5 | 4 | 4 | 5 | 5 | 5 | 5 | 5 | 5 |
|  | Moistness of sponge | 4 | 4 | 4 | 4 | 4 | 4 | 4 | 4 | 4 |
| Contrast product 2 | Color of whipped cream | 4 | 4 | 4 | 4 | 4 | 4 | 4 | 4 | 4 |
|  | Taste of whipped cream | 0 | 0 | 0 | 0 | 0 | 0 | 0 | 0 | 0 |
|  | Taste of strawberry | 0 | 0 | 0 | 0 | 0 | 0 | 0 | 0 | 0 |
|  | Moistness of sponge | 0 | 0 | 0 | 0 | 0 | 0 | 0 | 0 | 0 |
| Test product | Color of whipped cream | 5 | 5 | 5 | 5 | 5 | 5 | 5 | 5 | 5 |
|  | Taste of whipped cream | 5 | 4 | 5 | 5 | 5 | 5 | 5 | 4 | 5 |
|  | Taste of strawberry | 5 | 5 | 5 | 5 | 5 | 5 | 5 | 5 | 5 |
|  | Moistness of sponge | 5 | 5 | 5 | 5 | 5 | 5 | 5 | 5 | 5 |

In the above-mentioned results of evaluation, virtually the same results were obtained on the color and taste of whipped cream between the pre-treatment contrast product 1 and the test product. With respect to the taste of strawberry, there were some opinions that the test product had a slightly stronger acidic taste and better freshness. Moreover, with respect to the moistness of sponge, all the people evaluated that the test product was better than the contrast product 1. This is presumably because the delicious flavor of the sponge was brought out during the preservation process of the present invention. Here, with respect to the contrast product 2, although discoloration of the whipped cream was not confirmed so much, no evaluation was available with respect to the other items due to progressed decomposition.

In each of the above-mentioned Examples 1 to 7, it was confirmed that when food was refrigerated and preserved or frozen and preserved by the preserving device of the present invention, the quality of the food was not lowered even after the preserving process.

INDUSTRIAL APPLICABILITY

In the present invention, food 9 is placed on a food tray 2, and the food 9 is cooled and preserved with an AC voltage and a DC voltage being simultaneously applied to the food tray 2 so that the same quality as the pre-treatment quality can be kept even after the preservation. Therefore, it becomes possible to preserve the food 9 for a long time without causing deterioration in the food 9.

In the present invention, as well as the food that has been refrigerated or frozen and preserved in the past, foods that have been conventionally unsuitable for being refrigerated and frozen to be preserved, such as gel-state foods like agar jelly, which have been conventionally difficult to be frozen and preserved, or foods such as meat and sea foods including raw foods, such as raw fish larva and raw paste, which have been conventionally susceptible to a serious freezing failure and difficult to be frozen unless an additive or the like is added thereto, can also be frozen without any additives.

The inventor of the present invention believes that the above mentioned effects are achieved by (1) inactivation of dissolved oxygen, (2) miniaturization of water molecule cluster and (3) inhibition of a flow of juice, which are obtained by simultaneously applying an AC voltage and a DC voltage.

Moreover, since the above-mentioned principle of the present invention can prevent a deterioration in a quality on a cell level, this principle is useful not only for preserving food as described above, but also for a long-term preservation of a human organ or the like for medical purposes.

The invention claimed is:

1. A food preserving device comprising:
    a cooling box;
    a conductive food tray that is housed in the cooling box and upon which a food is directly placed;
    an AC power supply configured to generate an AC voltage that is not superimposed with DC voltage and to transmit the AC voltage to the food tray through an AC output terminal; and
    a DC power supply configured to generate a DC voltage that is not superimposed with the AC voltage and to transmit the DC voltage to the same food tray through a DC output terminal, the DC output terminal being connected to the same food tray separately from the AC output terminal;
    wherein the AC voltage and the DC voltage are transmitted separately to and simultaneously applied to the food tray via the respective AC output terminal and DC output terminal.

2. The food preserving device according to claim 1, wherein after a DC-AC simultaneous application period during which the AC voltage and the DC voltage are simultaneously applied, only one of the DC voltage and the AC voltage is applied to the food tray by the control unit.

3. The food preserving device according to claim 1, wherein the cooling box functions as a freezer for freezing food.

4. The food preserving device according to claim 1, wherein the cooling box functions as a refrigerator for refrigerating food.

5. The food preserving device according to claim 4, further comprising a control unit that controls a voltage application to the food tray by the AC power supply and the DC power supply, and the control unit controls such that an AC voltage of 755V to 3500V and a negative DC voltage whose absolute value is larger than the AC voltage are applied to the food tray.

* * * * *